(12) United States Patent
Inoue et al.

(10) Patent No.: US 10,293,732 B2
(45) Date of Patent: May 21, 2019

(54) CONTAINER HOLDER INCLUDING A SWING MEMBER ROTATABLY SUPPORTING A ROLLER TO HOLD A CONTAINER RECEIVED THEREIN

(71) Applicants: HONDA MOTOR CO., LTD., Tokyo (JP); NIFCO INC., Yokosuka-shi, Kanagawa (JP)

(72) Inventors: Kei Inoue, Wako (JP); Kozo Kobayashi, Wako (JP); Koji Kondo, Yokosuka (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/567,759

(22) PCT Filed: May 6, 2016

(86) PCT No.: PCT/JP2016/002251
§ 371 (c)(1),
(2) Date: Oct. 19, 2017

(87) PCT Pub. No.: WO2016/178325
PCT Pub. Date: Nov. 10, 2016

(65) Prior Publication Data
US 2018/0105089 A1 Apr. 19, 2018

(30) Foreign Application Priority Data
May 7, 2015 (JP) .................. 2015-094797

(51) Int. Cl.
*B60N 3/10* (2006.01)
*B60R 7/06* (2006.01)
(52) U.S. Cl.
CPC ............. *B60N 3/106* (2013.01); *B60N 3/101* (2013.01); *B60R 7/06* (2013.01)

(58) Field of Classification Search
CPC ........... B60N 3/102; B60N 3/106; B60N 3/10
(Continued)

(56) References Cited

U.S. PATENT DOCUMENTS 1,061,412 A * 5/1913 Semon ............... A47G 25/0657
211/89.01
1,616,442 A * 2/1927 De Festenburg ...... A63C 17/24
280/843
(Continued)

FOREIGN PATENT DOCUMENTS

DE 29920019 U1 2/2000
DE 102005008626 B4 4/2008
(Continued)

OTHER PUBLICATIONS

International Search Report for International Application No. PCT/JP2016/002251, dated Aug. 2, 2016, 2 pages.
(Continued)

*Primary Examiner* — Chun Hoi Cheung
*Assistant Examiner* — Brijesh V. Patel
(74) *Attorney, Agent, or Firm* — Armstrong Teasdale LLP

(57) ABSTRACT

A container holder (10, 90) includes a main body (20) formed with a recess (21) having an open top defined therein for receiving a container, a swing member (40) rotatably supported by the main body so as to be swung into and out of the recess, a roller (50) supported by the swing member so as to be rotated around a prescribed rotational center line (B) by a container engaging the roller as the container is pushed into and pulled out of the recess, and a biasing member (60) urging the swing member into projecting into the recess, wherein the swing member is provided with an inclined surface (47) extending from a part thereof located outward of an outer periphery (53) of the roller, above the roller and outward of the recess to a part thereof located
(Continued)

directly above or inward of the rotational center line of the roller.

7 Claims, 13 Drawing Sheets

(58) Field of Classification Search
USPC ...... 248/311.2, 313–314, 154; 220/737, 759; 224/926, 282, 542; 24/488, 509, 11 R, 24/3.7
See application file for complete search history.

(56) References Cited

U.S. PATENT DOCUMENTS

| | | | | |
|---|---|---|---|---|
| 4,845,738 | A * | 7/1989 | Takano | H04M 1/2155 379/424 |
| 5,549,331 | A * | 8/1996 | Yun | A63C 17/004 16/26 |
| 5,659,612 | A * | 8/1997 | Wang | B60R 11/0241 379/426 |
| 5,697,593 | A * | 12/1997 | Bieck | B60N 3/102 224/282 |
| 6,860,457 | B2 * | 3/2005 | Then | B60N 3/101 224/926 |
| 7,413,244 | B2 * | 8/2008 | Tanaka | B60N 3/108 224/274 |
| 8,056,714 | B2 * | 11/2011 | Carnevali | H04M 1/04 206/305 |
| 8,297,441 | B2 * | 10/2012 | Eugui | B65D 1/243 206/427 |
| 2004/0118860 | A1 * | 6/2004 | Leopold | B60N 3/106 220/737 |
| 2005/0279752 | A1 * | 12/2005 | Harada | A47G 23/0225 220/759 |
| 2006/0186283 | A1 * | 8/2006 | Liu | B60N 3/106 248/154 |
| 2007/0205205 | A1 * | 9/2007 | Kliewer | A47G 23/0225 220/737 |
| 2009/0146035 | A1 * | 6/2009 | Kaemmer | B60N 3/106 248/313 |
| 2010/0200720 | A1 * | 8/2010 | Kaemmer | B60N 3/106 248/311.2 |
| 2015/0251582 | A1 * | 9/2015 | Sawada | B60N 3/10 220/737 |

FOREIGN PATENT DOCUMENTS

| | | | | |
|---|---|---|---|---|
| EP | | 1897748 A2 * | 3/2008 | B60N 3/106 |
| JP | | 2008195159 A | 8/2008 | |
| JP | | 2008201228 A | 9/2008 | |
| KR | | 20050049051 A | 5/2005 | |

OTHER PUBLICATIONS

Office Action for Chinese Patent Application No. 201680026333.9, dated Dec. 21, 2018, 3 pages.

* cited by examiner

CONTAINER HOLDER INCLUDING A SWING MEMBER ROTATABLY SUPPORTING A ROLLER TO HOLD A CONTAINER RECEIVED THEREIN

CROSS-REFERENCE TO RELATED APPLICATIONS

This application is a U.S. National Phase Application of PCT/JP2016/002251, filed May 6, 2016, which claims the benefit of Japanese Patent Application No. 2015-094797, filed May 7, 2015. The contents of these applications are hereby expressly incorporated by reference in their entirety.

TECHNICAL FIELD

The present invention relates to a container holder for holding a container, and more particularly to a container holder configured to be installed in a passenger compartment of a motor vehicle for holding a beverage container.

BACKGROUND ART

In the field of container holders, it is known to hold a beverage container in a recess of a container holder having an open top in a stable manner by urging a moveable member biased inwardly of the recess by a biasing member against a side of the beverage container. The moveable member may consist of a single member or multiple members, and the container may be held between a moveable member and a sidewall of the recess or between two moveable members. In this manner, beverage containers of a wide range of shapes and a wide range of sizes can be held in a stable manner In one of such known container holders, the moveable member rotatably supports a roller (Patent Document 1, for instance). In the container holder disclosed in Patent document 1, the moveable member is rotatably supported by a container holder main body at one end thereof, and rotatably supports a roller at the other end thereof. The moveable member is inwardly biased by a biasing member, and a part of the outer periphery of the roller supported by the moveable member projects into the recess when no container is held in the container holder. When a container is pushed into the recess, the bottom part or the side part of the container engages the roller, and causes the roller to rotate so that the container may be pushed into the recess with a relatively small resistance.

PRIOR ART DOCUMENT(S)

Patent Document(s)

Patent Document 1: DE10200500862B4

SUMMARY OF THE INVENTION

Task to be Accomplished by the Invention

However, in a container holder having a roller rotatably supported by a movable member as disclosed in Patent Document 1, depending on the position of the container which is about to be pushed into the recess of the container holder, a bottom part or a side part of the container may be pushed against the outer periphery of the roller in a downward and perpendicular direction. In such a case, a component of force effective in rotating the roller may be so small that the roller may not be rotated, and hence the container may encounter a significant resistance during the course of being pushed into the recess. In other words, according to this prior art, a container may not be pushed into the recess of the container holder in an effortless manner In view of such a problem of the prior art, a primary object of the present invention is to provide a container holder that allows a container to be pushed into a recess of the container holder in an effortless manner Means to Accomplish the Task To achieve such an object, the present invention provides a container holder (10, 90) for holding a container (80), comprising a main body (20) formed with a recess (21) having an open top defined therein for receiving a container; a swing member (40) rotatably supported by the main body so as to be swung into and out of the recess; a roller (50) supported by the swing member so as to be rotated around a prescribed rotational center line (B) by a container engaging the roller as the container is pushed into and pulled out of the recess; and a biasing member (60) urging the swing member into projecting into the recess; wherein the swing member is provided with an inclined surface (47) extending from a part thereof located outward of an outer periphery (53) of the roller, above the roller and outward of the recess to a part thereof located directly above or inward of the rotational center line of the roller.

According to this arrangement, because the inclined surface extends through a point directly above the rotational center line of the roller, when the container is pushed onto a part of the roller located directly above the rotational center line of the roller, a bottom part or a side part of the container comes into contact with the inclined surface. Upon contacting the inclined surface, the container slides along the inclined surface inwardly of the recess, and then is guided by the outer periphery of the roller. At the same time, the swing member which is pushed by the container at the inclined surface thereof swings outward of the recess. At this time, the container contacts a part of the outer periphery of the roller which is more inward of the recess than the rotational center line of the roller. Therefore, the bottom part or the side part of the container which is being pushed into the recess is prevented from contacting the outer periphery of the roller from a direction orthogonal thereto so that the roller is induced to be rotated. In other words, introduction of the container into the recess is facilitated. The roller receives a frictional force from the container as the container is brought into contact with the roller, and at the same time, the swing member is caused to tilt outwardly of the recess by receiving a pressure directed outwardly of the recess from the container via the roller against the biasing force of the biasing member.

In this invention, preferably, a rotational center line (C) of the swing member is positioned below the roller.

Thereby, when pulling a container from the recess, the pulling force acts upon the swing member in a direction to recede the swing member away from the recess so that the resistance encountered in pulling the container out of the recess can be reduced.

In this invention, preferably, the inclined surface extends to a part adjoining an axial end of the roller.

According to this arrangement, because the inclined surface extends from a part above and outward of the recess to a part adjoining an axial end of the roller or beyond a position directly above the rotational center line of the roller, the inclined surface can cover a wide area extending into the recess. Thereby, the chance of the bottom part or the side part of the container pushed into the recess contacting the inclined surface can be maximized As a result, the insertion of a container into the recess can be facilitated.

In this invention, the roller may be provided with a surface layer having a higher frictional coefficient than the inclined surface of the swing member.

Thereby, the frictional force acting between the container received in the recess and the outer periphery of the roller is increased so that the container can be firmly held by the roller. In particular, a circumferential motion or a rotation of the container can be restrained. As a result, when the container is fitted with a screw cap, the screw cap can be closed and opened simply by turning the screw cap of the container received in the recess with a single hand.

In this invention, preferably, the roller includes an inner member (51) consisting of a rotary shaft (51a) and an outer member (52) consisting of a cylindrical member fitted on an outer periphery (51b) of the inner member, wherein the outer member is made of a material having a higher coefficient of friction than the inner member.

Thereby, a roller having a surface layer made of a material having a high frictional coefficient can be obtained in a simple manner In this invention, preferably, a projection (51c) is formed in one of the outer periphery of the inner member and an inner periphery of the outer member, and a corresponding recess (52b) is formed in the other of the outer periphery of the inner member and the inner periphery of the outer member so that the inner member and the outer member are combined with each other simply by fitting the projection into the recess.

According to this arrangement, the inner member and the outer member can be combined with each other in a simple manner In this invention, a rib (92) may be provided on the inclined surface.

Thereby, the contact area between the container and the inclined surface when introducing the container into the recess can be reduced as compared to the case where no such rib is provided so that the frictional resistance which the container receives from the inclined surface is reduced. Therefore, the insertion of the container into the recess can be facilitated.

In this invention, a bottom wall of the recess may be provided with a surface layer having a higher frictional coefficient than a side wall of the recess.

Thereby, the frictional force acting between the bottom part of the container and the bottom wall of the recess is increased so that the circumferential rotation of the container can be restrained. As a result, when the container is fitted with a screw cap, the screw cap can be closed and opened simply by turning the screw cap of the container received in the recess with a single hand.

Effect of the Invention

According to such an arrangement, the insertion of a container into the recess of the container holder can be facilitated.

BRIEF DESCRIPTION OF THE DRAWINGS

FIG. 8b is an enlarged schematic view of a part of FIG. 8a;

FIG. 12b is an enlarged schematic view of a part of FIG. 12a; and

DESCRIPTION OF THE PREFERRED EMBODIMENT(S)

Preferred embodiments of the present invention in the form of container holders configured to be installed in a center console of a motor vehicle are described in the following with reference to the appended drawings.

(First Embodiment)

Figure 1:
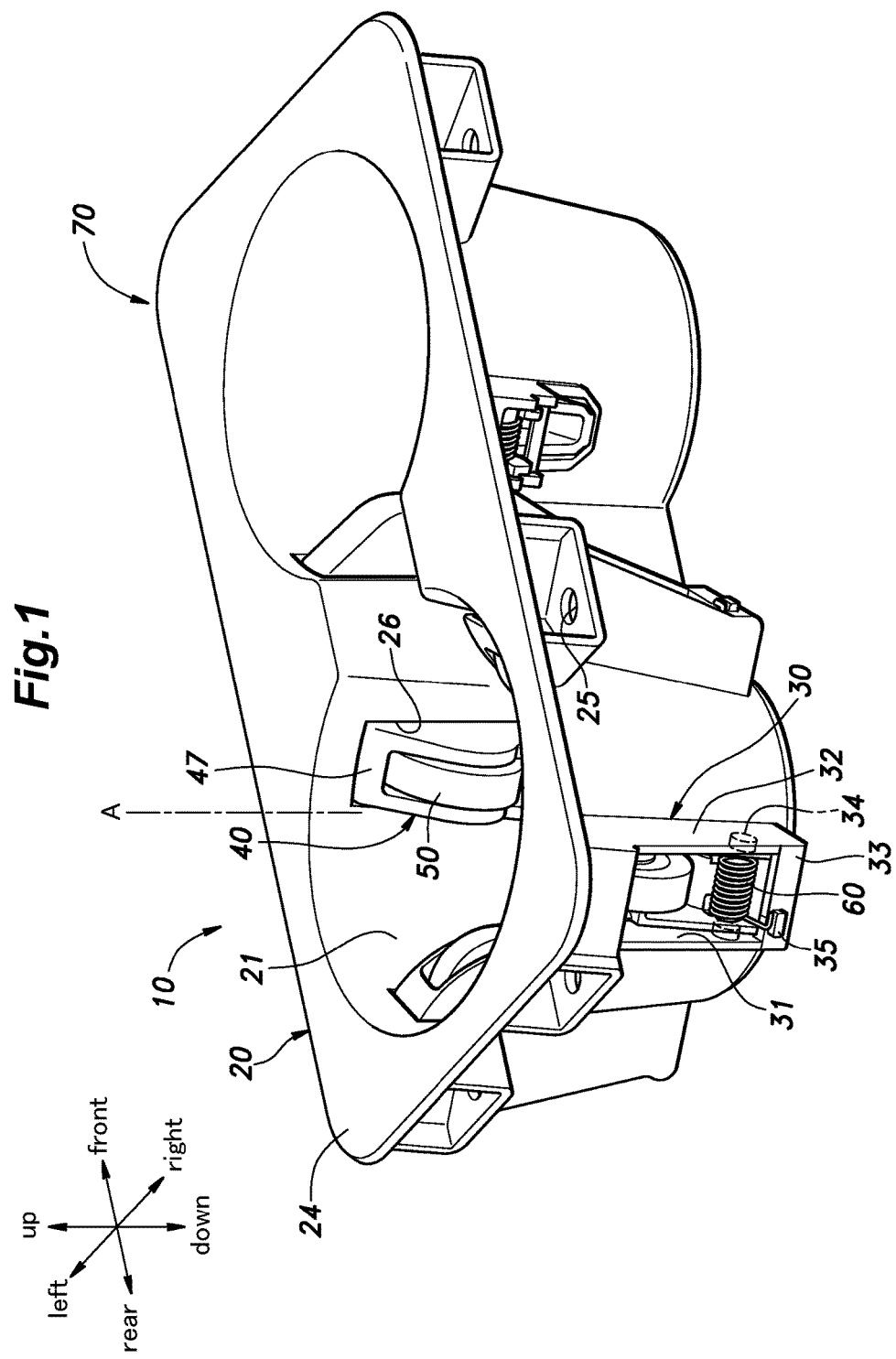
FIG. 1 is a perspective view of a container holder according to a first embodiment of the present invention.

As shown in FIG. 1, a container holder 10 of the present invention is combined with another type of container holder 70 arranged on the front side of a container holder 10 in an integral manner In the present embodiment, the container holder 10 is integrally formed with another type of container holder 70, but the container holder 10 may also be formed independently.

Figure 2:
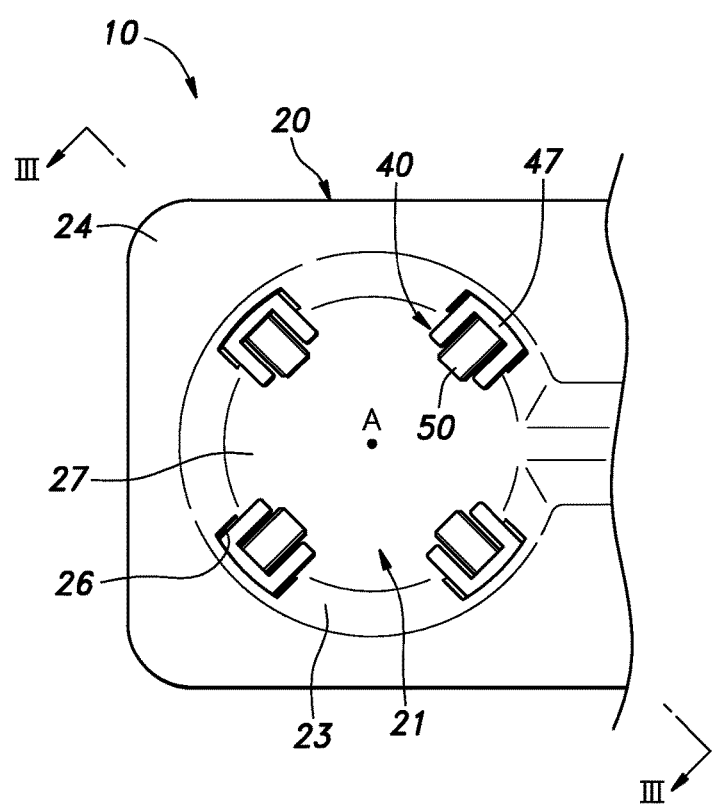
FIG. 2 is a plan view of the container holder.
Figure 3:
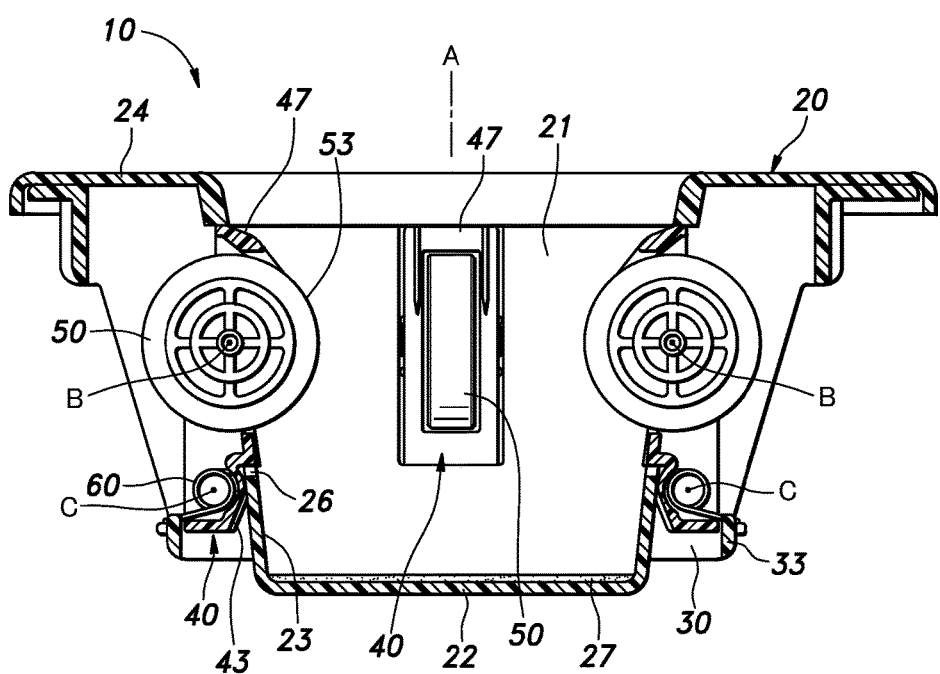
FIG. 3 is a sectional view taken along line of FIG. 2.

As shown in FIGS. 1 to 3, the container holder 10 of the present invention comprises a main body 20 formed with a storage recess 21 for receiving and holding a beverage container, a swing member 40 rotatably supported by the main body 20 so as to move into and out of the recess 21, a roller 50 rotatably supported by the swing member 40, and a torsion coil spring 60 attached to the swing member 40. In the present embodiment, the container holder 10 is provided with four swing members 40. Note that the number of the swing members 40 is not limited to this, and can be appropriately changed. For example, the number of the swing members 40 may be three.

As shown in FIG. 3, the main body 20 includes a circular bottom wall 22, a cylindrical side wall 23 extending upright from the periphery of the bottom wall 22, and an upper wall 24 extending radially outward from the upper end of the side wall 23. The upper wall 24 is provided with a plurality of mounting holes 25 for attaching the main body 20 to a center console of the motor vehicle by screws or the like.

The recess 21 is formed by the bottom wall 22 and the side wall 23, and is formed in a cylindrical shape with a closed bottom and an open top. The upper end of the side wall 23 forms the open end of the recess 21. An axial line centrally passing through the circular bottom wall 22 and orthogonal to the bottom wall 22 is defined as a central axial line A of the recess 21. The cylindrical side wall 23 is flared toward the upper end thereof with respect to the central axial line A in such a manner that the diameter of the recess 21 increases from the bottom wall 22 toward the upper open end. In other words, the recess 21 is provided with an inverted frusto-conical shape. The recess 21 dimensioned so as to favorably receive a beverage container such as a plastic bottle (PET bottle), a metal can, a paper cup or the like.

The main body 20 is formed by molded plastic, and may consist of a plurality of component members. For example, the main body 20 may consist of an upper member including the upper wall 24 and a lower member including the bottom wall 22 and the side wall 23.

Four openings 26 are formed in the side wall 23 of the housing recess 21 at a regular interval along the circumference thereof (at an interval of 90 degrees around the central axial line A) (see FIG. 2). Each opening 26 is passed through the thickness of the side wall 23. The openings 26 are identical in shape, and are each provided with a vertically elongated rectangular shape. Each opening 26 serves as a passage through which a swing member 40 rotatably supported by the main body 20 passes into and out of the recess 21.

A mat 27 made of a material having a higher coefficient of friction than the main body 20 is laid on the upper surface of the bottom wall 22 of the recess 21 (see FIG. 2). The mat 27 is, for example, a sheet of elastomer, rubber or the like, and is attached to the upper surface of the bottom wall 22 by a double-sided tape, an adhesive, or the like. The mat 27 increases the frictional force that can be applied to the bottom surface of the container, and restrains or restricts movements and rotation of the container with respect to the bottom wall 22.

A part of the main body 20 adjoining the outer end of each opening 26 is provided with a support portion 30 for accommodating and supporting the swing member 40. The support portion 30 includes a pair of side walls 3 land 32, and a bottom wall 33. One side of these walls 31 to 33 of the support portion 30 is joined to the outer surface of the side wall 23 (or the surface facing away from the recess 21) of the recess 21 along the outer periphery of the opening 26. Therefore, the three walls of the support portion 30 defines a space communicating with the corresponding opening 26 of the side wall 23. This space receives the corresponding swing member 40.

A pair of pivot pins 34 for pivotally supporting the swing member 40 project from the inner surfaces of the side walls 31 and 32 of the support portion 30, respectively. The pivot pins 34 are located lower than the lower edge of the opening 26.

Each swing member 40 is thus rotatably supported by the corresponding support portion 30. In particular, the four swing members 40 are disposed at an interval of 90 degrees around the central axial line A (see FIG. 2). The four swing members 40 are identical in shape and structure.

Figure 4:
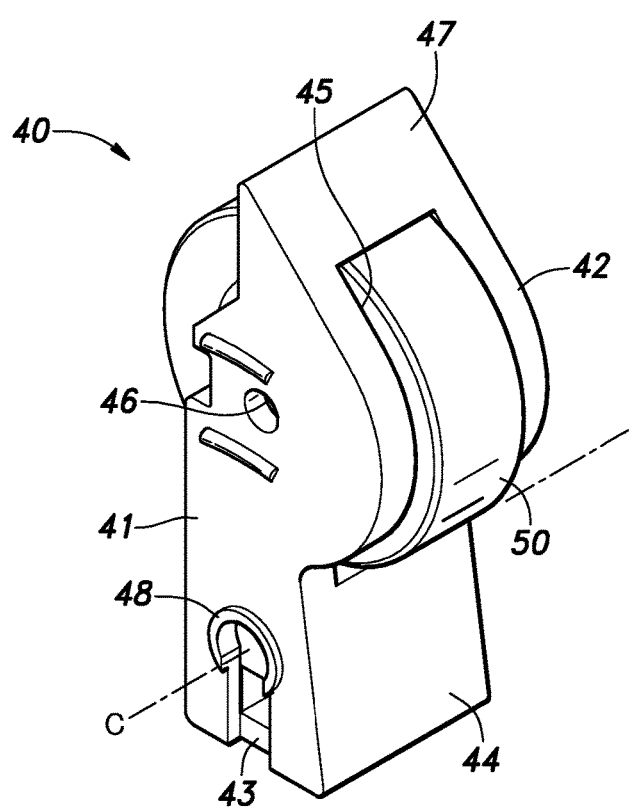
FIG. 4 is a perspective view of a swing member and a roller of the first embodiment.

As shown in FIG. 4, the swing member 40 consists of a vertically elongated member, and includes a pair of side walls 41 and 42, a lower wall 43 that connects the lower edges of the side walls 41 and 42 to each other, and a front wall 44 that connects the front edges of the side walls 41 and 42 to each other. The front wall 44 is provided with an opening 45 having the shape of a vertically elongated rectangle. The width of the opening 45 is greater than the lateral dimension of the roller 50. The part of the front wall 44 extending along either side of the opening 45 is provided with an arcuate profile (in side view) having a convex side facing forward.

A pair of bearings 46 for rotatably supporting a rotary shaft 51a (see FIG. 5) of the roller 50 are coaxially formed in parts of the side walls 41 and 42 laterally adjoining the opening 45. The bearings 46 are passed through the thicknesses of the side walls 41 and 42. The rotational center line of the rotary shaft 51a of the roller 50 journaled by the roller bearings 46 coincides with the rotational center line B of the roller 50.

A part of the front wall 44 located above the opening 45 is provided with an inclined surface 47 which descends toward the front. The inclined surface 47 extends from a part located behind a point located directly above the bearings 46 to a part located ahead of the point located directly above the bearings 46. In other words, the inclined surface 47 extends over the area located directed above the bearings 46 by a prescribed length.

A pair of columnar bosses (not shown in the drawings) project from the inner surfaces of the side walls 41 and 42 at a part located below the opening 45. A pair of bearing holes 48 are formed in the side walls 41 and 42, respectively, at the parts corresponding to the columnar bosses in a mutually coaxial relationship. The lower side of each bearing hole 48 is connected to a downwardly extending slot. When installing the swing member 40 in the support portion 30, each pivot pin 34 is passed into the corresponding slot until the corresponding bearing hole 48 is reached. By pivotally receiving the pivot pins 34 in the respective bearing holes 48, the swing member 40 is rotatably supported by the support portion 30. The rotational center line of the pivot pins 34 received in the bearing holes 48 provides the rotational center line C of the swing member 40. The rotational center line C of the swing member 40 is in parallel with the rotational center line B of the roller 50.

Figure 5:
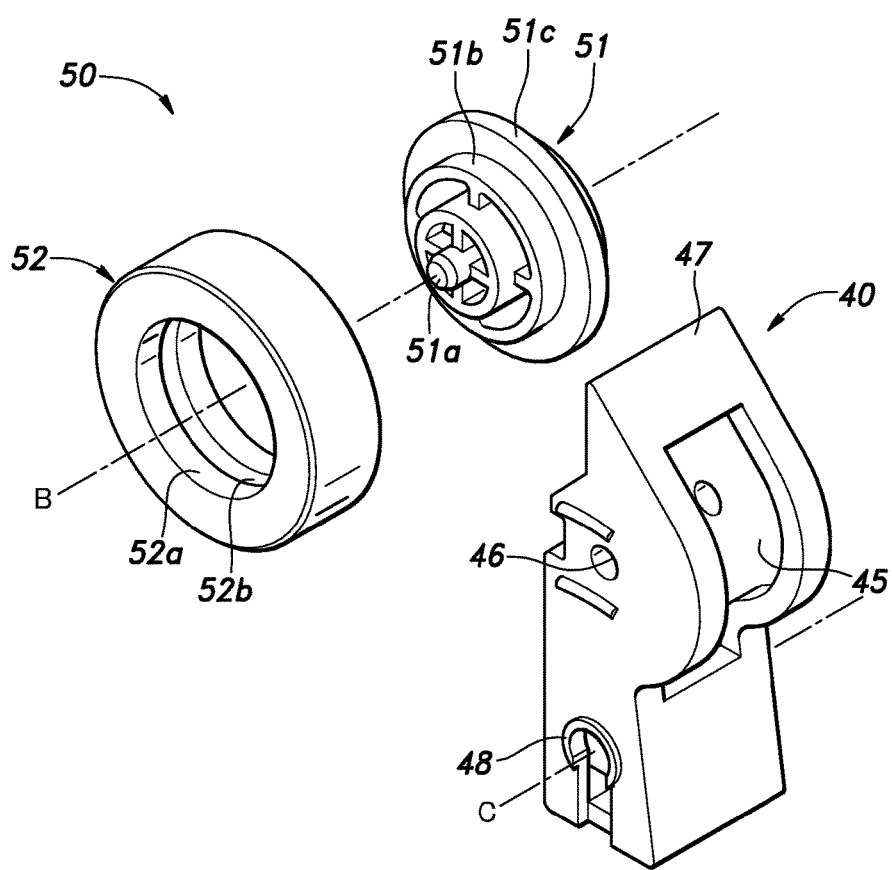
FIG. 5 is an exploded perspective view of the swing member and the roller.
Figure 6:
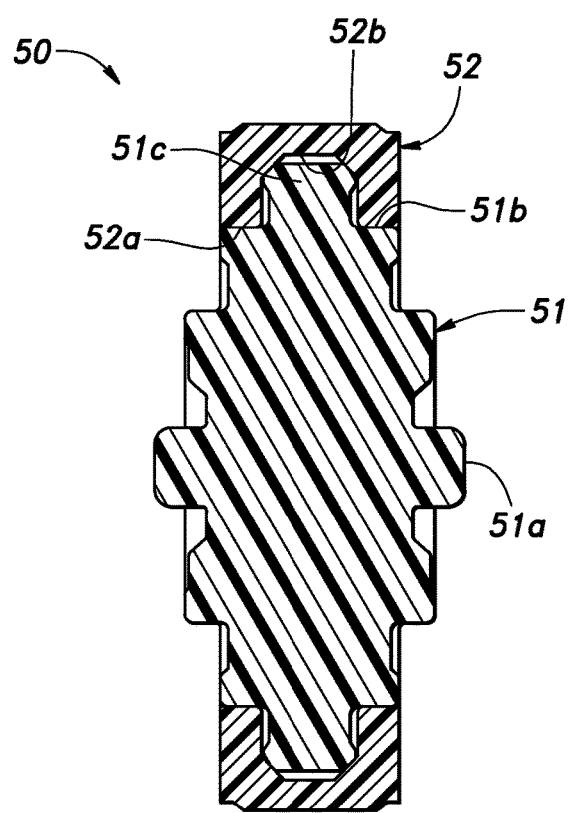
FIG. 6 is a sectional side view of the roller.

As shown in FIG. 5, the roller 50 is composed of an inner member 51 including a rotary shaft 51a and a cylindrical outer member 52 attached to an outer periphery 51b of the inner member 51 so as to cover the outer periphery 51b of the inner member 51. As shown in FIG. 6, a projection 51c is formed along the outer periphery 51b of the inner member 51, and a complementary recess 52b is formed along an inner periphery 52a of the outer member 52. By fitting the projection 51c of the inner member 51 into the recess 52b of the outer member 52, the inner member 51 and the outer member 52 can be joined to each other. The outer member 52 fitted on the outer periphery 51b of the inner member 51 forms a surface layer of the roller 50.

The outer member 52 is formed of a material having a higher coefficient of friction than the inner member 51. The outer member 52 may be formed of a soft material such as elastomer and rubber. For example, the inner member 51 may be formed from POM (polyacetal), and the outer member 52 may be formed from EPDM (ethylene-propylene-diene rubber). By forming the outer member 52 from a material having a high frictional coefficient, the frictional force acting between the container received in the recess 21 of the main body 20 and the outer periphery 53 of the roller 50 is increased. Consequently, the container received in the recess 21 is firmly supported by the rollers 50, and in particular, the circumferential rotation of the container is restrained.

The rotary shaft 51a of the inner member 51 is journaled by the roller bearings 46 of the swing member 40 so that the roller 50 is rotatably supported by the swing member 40. A part of the outer periphery 53 of the roller 50 supported by the bearings 46 protrudes forward from the opening 45 of the front wall 44 of the swing member 40 (see FIG. 4).

The torsion coil spring 60 serves as a biasing member for urging the swing member 40 in the direction to protrude into the recess 21. The coil part of the torsion coil spring 60 is supported by the bosses (not shown in the drawings) formed on the respective inner surfaces of the side walls 41 and 42 of the swing member 40. One arm at one end of the torsion coil spring 60 abuts against the inner surface of the front wall 44 of the swing member 40, and another arm at the other end is in contact with a spring engagement portion 35 formed on the upper surface of the lower wall 43 of the swing member 40 (See FIG. 1). As a result, the swing member 40 is biased toward the inside of the recess 21.

When a container is not received in the recess 21 as shown in FIGS. 1 to 3, a part of each swing member 40 which is urged by the torsion coil spring 60 is pushed into the recess 21 through the corresponding opening 26 of the side wall 23 of the recess 21. The lower wall 43 of the swing member 40 abuts against the outer surface of the side wall 23 of the recess 21 (see FIG. 3). This state is defined as an initial state.

In the initial state, the inclined surface 47 of the swing member 40 protrudes into the recess 21 in such a manner that the inclined surface 47 extends from a position behind a point directly above the rotational center line B of the roller to a position ahead of the point directly above the rotational center line B of the roller. In other words, the inclined surface 47 extends above the outer periphery 53 of the roller 50 by a certain length covering a position directly above the rotational center line B of the roller 50. In this initial state, the rear end of the inclined surface 47 is positioned more outward than the end of the opening 26 on the side of the recess 21. A part of the upper wall 24 of the main body 20 adjacent to the peripheral edge of the opening of the recess 21 is chamfered so that the upper surface of the upper wall 24 of the main body 20 is smoothly and continuously connected to the inclined surface 47.

The mode of operation and advantages of the container holder 10 according to the first embodiment discussed above are described in the following. Although the container holder 10 of the present embodiment includes four swing members 40, only one swing member 40 will be discussed in the following disclosure because all of the four swing members 40 have an identical structure, and function in an identical manner.

In this embodiment, the container 80 received and held in the container holder 10 is a plastic bottle (PET bottle) having a narrowed section. This plastic bottle has a screw cap (not shown in the drawings) at the top. It should be noted that the container 80 received and held in the container holder 10 is not limited to this, but may also consist of a metal can, a paper cup, or the like.

Figure 7:
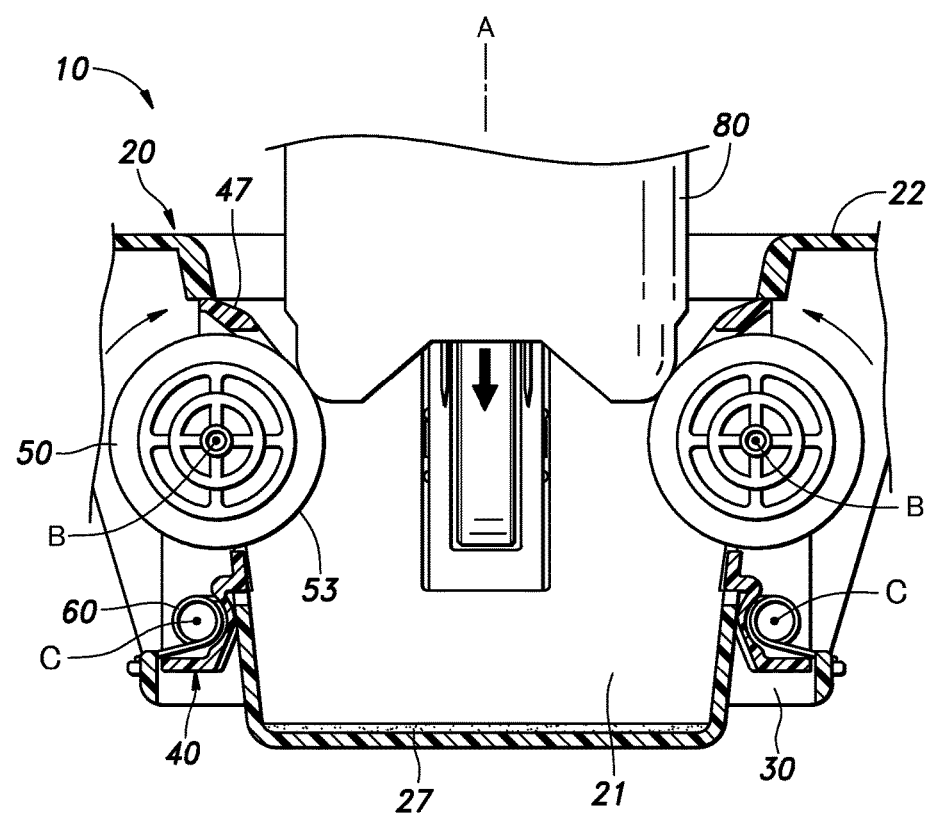
FIG. 7 is a sectional view of the container holder when a container is being inserted into a recess of the container holder.

As shown in FIG. 7, when the container 80 is inserted into the recess 21 in alignment with the central axial line A of the recess 21, the bottom part and the side part of the container 80 descend into the recess 21 without coming into contact with the inclined surface 47 of the swing member 40, and contacts only the outer periphery 53 of the roller 50. At this time, the container 80 abuts against the outer periphery 53 of the roller 50 at a position more inward of the recess 21 than the rotational center line B of the roller 50.

Figure 8A:
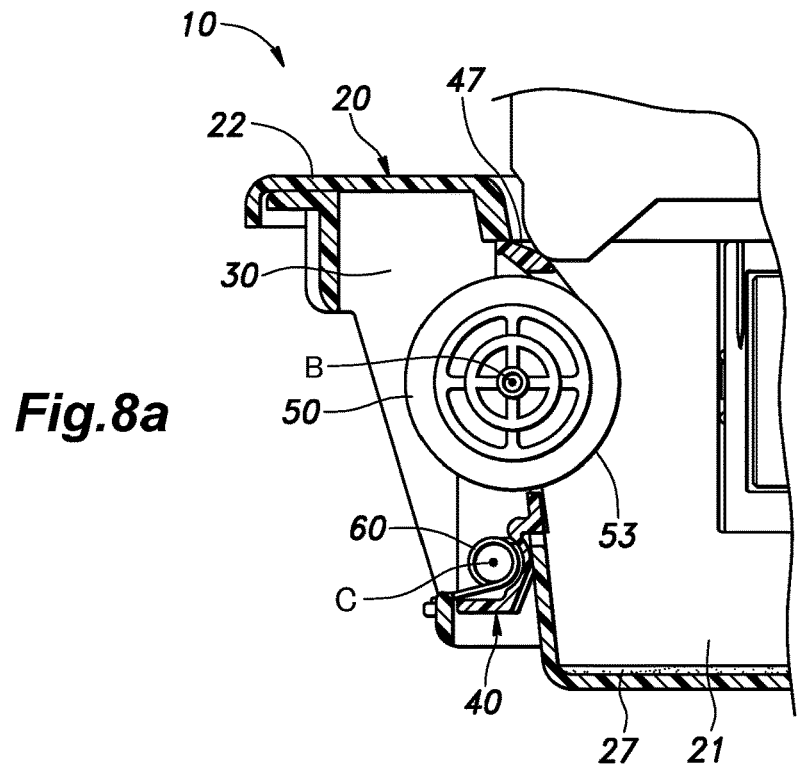
FIG. 8a is a sectional view of the container holder when a bottom part of the container is in contact with an inclined surface.
Figure 8B:
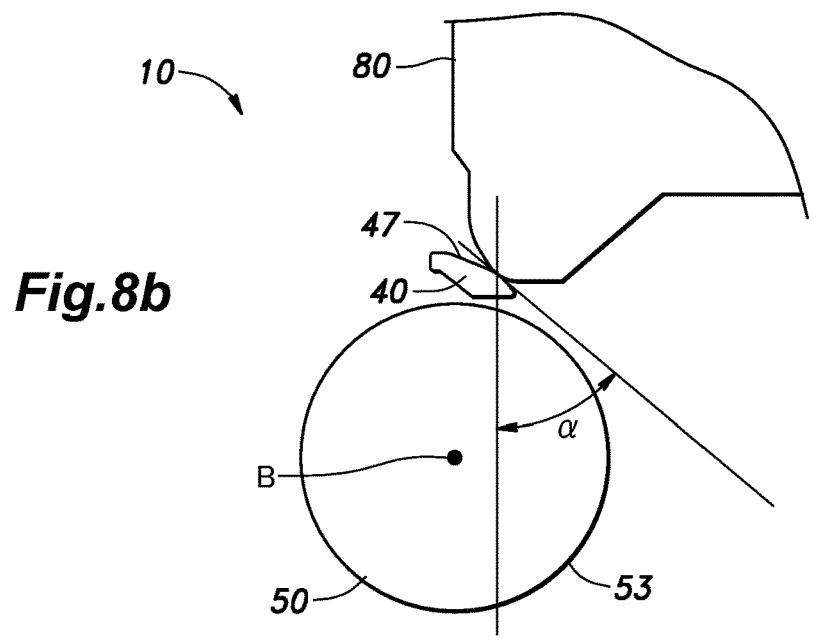

When the container 80 is inserted into the recess 21 in a laterally offset manner as shown in FIG. 8*a*, the bottom or side part of the container 80 comes into contact with the inclined surface 47 of the swing member 40. In this embodiment, the bottom part of the container 80 is in contact with the inclined surface 47 at a certain angle a (see FIG. 8*b*). The container 80 in contact with the inclined surface 47 slides along the inclined surface 47 and is guided toward the inside of the recess 21. At the same time, the swing member 40 pushed at the inclined surface 47 thereof tilts outward (receding direction) of the recess 21 under a component of force directed outward of the recess 21. While the container 80 is pushed into the recess 21, and the swing member 40 is forced out of the recess 21, the container 80 is guided by the roller 50. At this time, the container 80 abuts against the outer periphery 53 of the roller 50 at a position more inward of the recess 21 than the rotational center line B of the roller 50.

Therefore, according to the container holder 10 of the first embodiment of the present invention, the container 80 inserted in the recess 21 is prevented from abutting against the outer periphery 53 of the roller 50 at a position directly above the rotational center line B. As a result, the tilting of the swing member 40 and the rotation of the roller 50 are induced so that the container 80 can be inserted into the accommodation recess 21 in an effortless manner.

Figure 9:
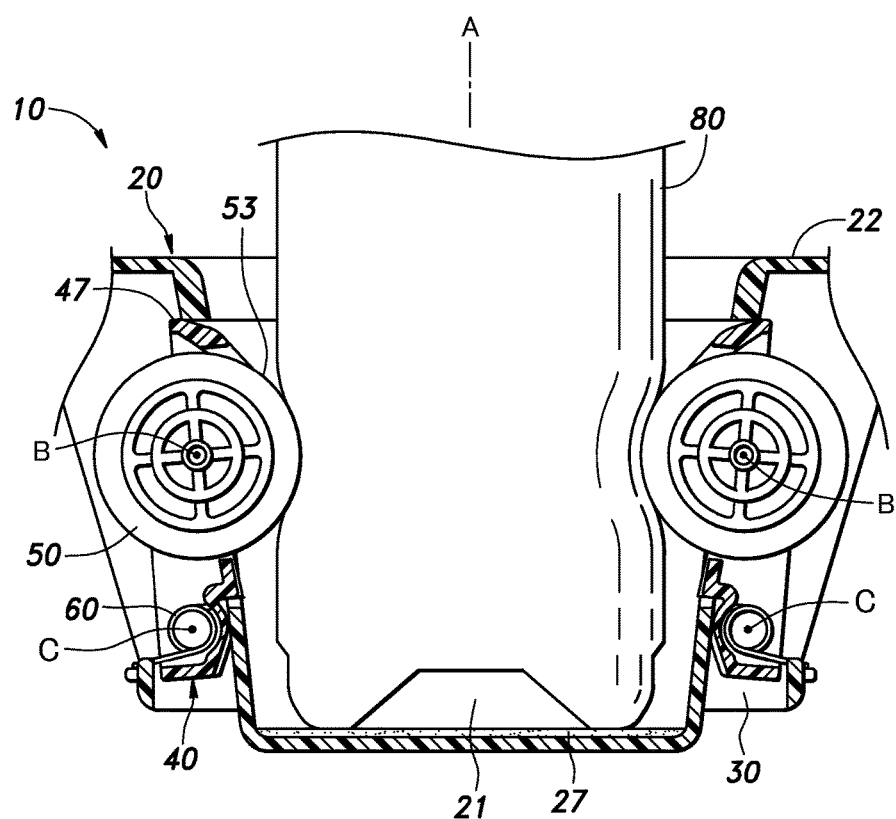
FIG. 9 is a sectional view of the container holder when a container is fully received in the recess.
Figure 10:
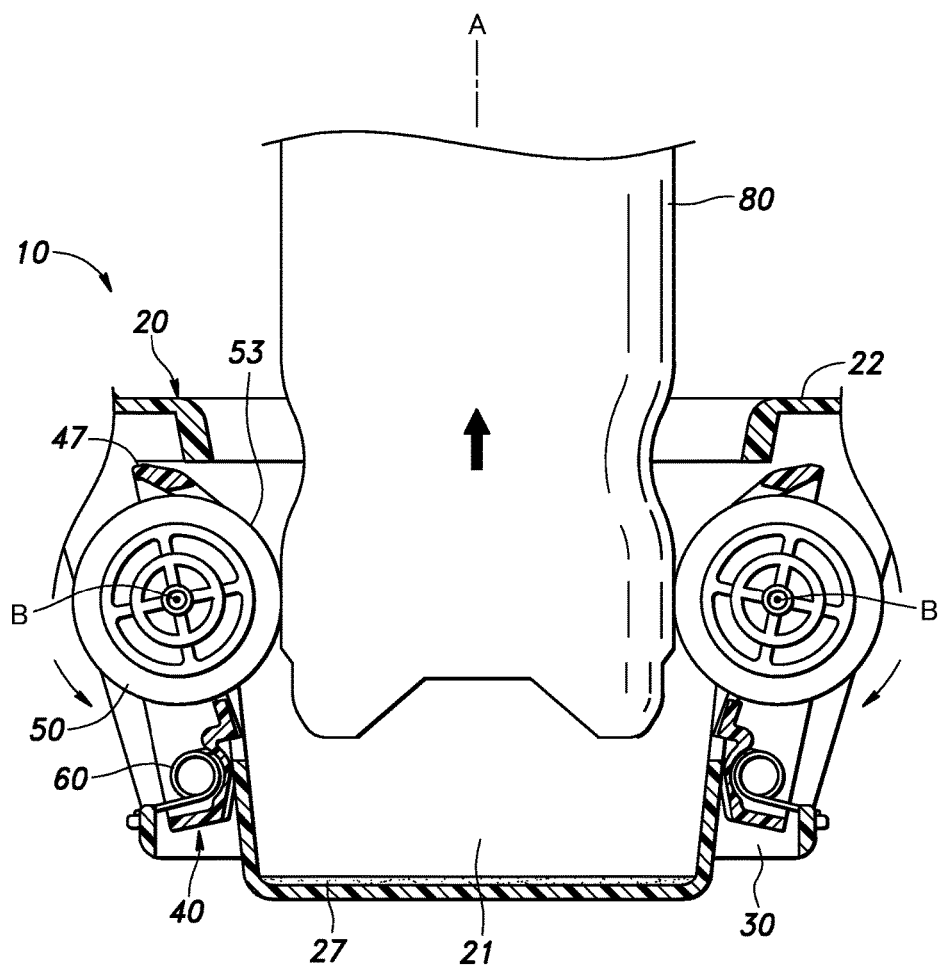
FIG. 10 is a sectional view of the container holder when a container is being pulled out of the recess.
Figure 11:
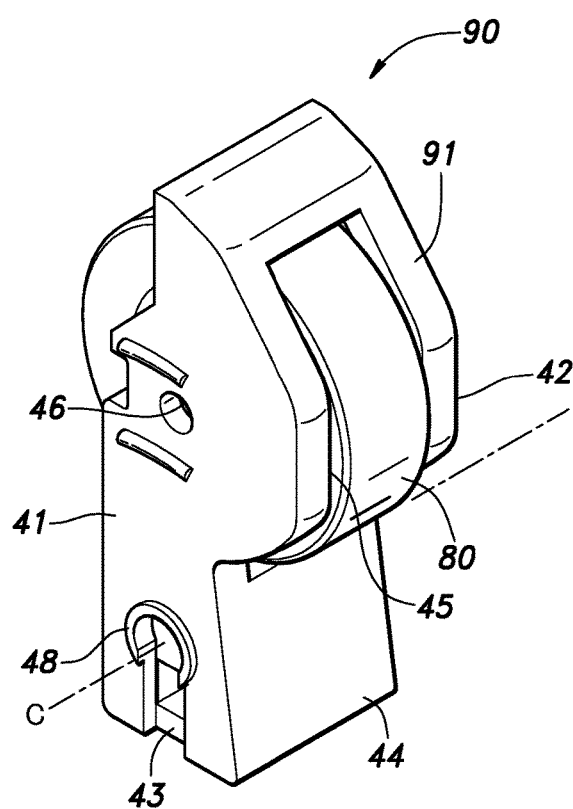
FIG. 11 is a perspective view of a swing member of a container holder according to a second embodiment of the present invention.

When the container 80 is pushed further downward from the state in which the container 80 is in contact with the outer periphery 53 of the roller 50 towards the lower side of the recess 21, the roller 50 is rotated about the rotational center line B thereof by the frictional force generated between the roller 50 and the container 80. At the same time, the swing member 40 receives a force from the container 80 that pushes the swing member 40 outward of the recess 21 via the roller 50 against the biasing force of the torsion coil spring 60. The container 80 is then received in a space created between the rollers 50 owing to the outward tilting movement of the wing members 40. The container 80 is held between the rollers 50 as shown in FIG. 9. In this embodiment, the rollers 50 engage the narrowed section of the container 80.

Since the outer member 52 forming the surface layer of the roller 50 is made of a material having a high coefficient of friction, when the container 80 is received in the recess 21, and is interposed and supported between the rollers 50, a large frictional force is created between the rollers 50 and the container 80. Consequently, the container 80 received in the recess 21 is firmly supported by the rollers 50, and in particular, is restrained from undergoing a circumferential rotation.

Further, since the mat 27 made of a material having a high frictional coefficient is laid on the upper surface of the bottom wall 22 of the recess 21, owing to the frictional force acting between the mat 27 and the bottom part of the container 80, the rotation of the container 80 in the circumferential direction is restrained. As a result, the user can grasp the screw cap of the container 80 with a single hand, and open and close the screw cap by turning the screw cap in the corresponding directions.

When the container 80 is pulled out from the housing recess 21 along the central axial line A, the bottom part of the container 80 comes into contact with the outer periphery 53 of the roller 50. Coming in contact with the container 80, the roller 50 receives a frictional force from the container 80, and is thereby rotated around the rotation center line B. At the same time, by being pressed outwardly of the recess 21 by the container 80 via the roller 50, the swing member 40 tilts outward against the biasing force of the torsion coil spring 60. The roller 50 is thus allowed to move away from the container 80, and is prevented from excessively restraining the container 80.

Since the rotational center line C of the swing member 40 is located below the roller 50, when pulling out the container 80 from the recess 21, the force used for pulling the container 80 upward is transmitted to the swing member 40 in the direction to cause the swing member 40 to move away from the recess 21 so that the container 80 can be pulled out without encountering any significant resistance. Therefore, the container 80 can be pulled out of the recess 21 without being unduly hampered by the roller 50. In particular, even when the container 80 consists of a plastic bottle or the like having a narrowed section, the container 80 can be pulled out of the recess 21 without being hampered by the roller 50. By thus positioning the rotational center line C of the swing member 40 below the roller 50, the container 80 can be pulled out from the recess 21 with less effort than in the case where the rotational center line C of the swing member 40 is located above the roller 50.

Once the container 80 is pulled out from the recess 21, the swing member 40 is urged by the torsion coil spring 60 to protrude into the recess 21 once again, and the initial state is regained.

(Second Embodiment)

The container holder 90 of the second embodiment differs from the container holder 10 of the first embodiment in the shape of the inclined surface formed on the swing member 40. The parts of the container holder 90 of the second embodiment corresponding to those of the container holder 10 of the first embodiment are denoted with like numerals without necessarily repeating the description of such parts.

The container holder 90 is provided with a second inclined surface 91 that is inclined downward from a part located above the upper edge of the opening 45 of the swing member 40 into lateral side parts of the opening 45. The second inclined surface 91 extends from a part located more outwardly of a point directly above the rotational center line B of the roller 50, and after passing through the point directly above the rotational center line B of the roller 50, extends to parts located on either lateral side of the roller 50. In other words, the second inclined surface 91 extends over a wide area located directly above the rotational center line B of the roller well into the interior of the recess 21.

Figure 12A:
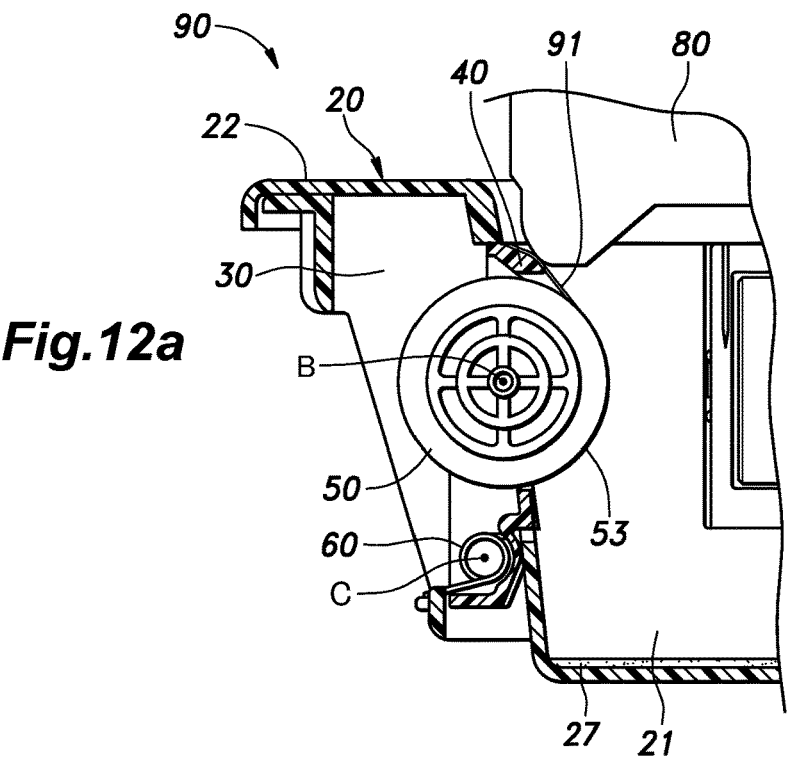
FIG. 12a is a sectional view of the container holder according to the second embodiment of the present invention.
Figure 12B:
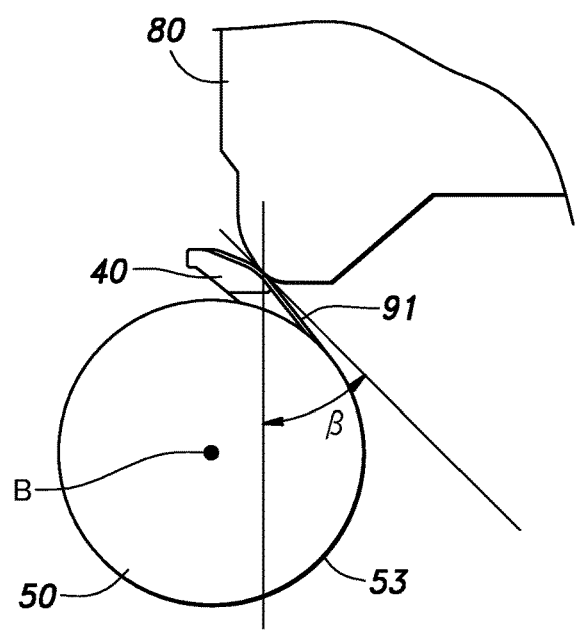

As shown in FIG. 12a, the second inclined surface 91 protrudes further into the recess 21 in such a manner that the bottom part or the side part of the container 80 inserted into the recess 21 is more likely to come into contact with the second inclined surface 91. In the illustrated situation, the container 80 is offset laterally in the recess 21, and the bottom part of the container 80 is in contact with the second inclined surface 91 at an angle β with respect to the second inclined surface 91 (see FIG. 12b). The container 80 that is in contact with the second inclined surface 91 slides on the second inclined surface 91 and is guided toward the inside of the recess 21 to be guided into contact with the outer periphery 53 of the roller 50. At this time, the container 80 abuts against the outer periphery 53 of the roller 50 at a position more inward of the recess 21 than the rotational center line B of the roller 50.

Therefore, according to the container holder 90 of the second embodiment of the present invention, the container 80 inserted into the recess 21 is prevented from contacting the outer periphery 53 of the roller 50 at a position directly above the rotational center line B so that the insertion of the container 80 into the recess 21 is facilitated.

Although the preferred embodiments of the present invention have been described above, the present invention is not limited to the above-described embodiments, and various modifications and changes are possible without departing from the spirit of the present invention.

Figure 13:
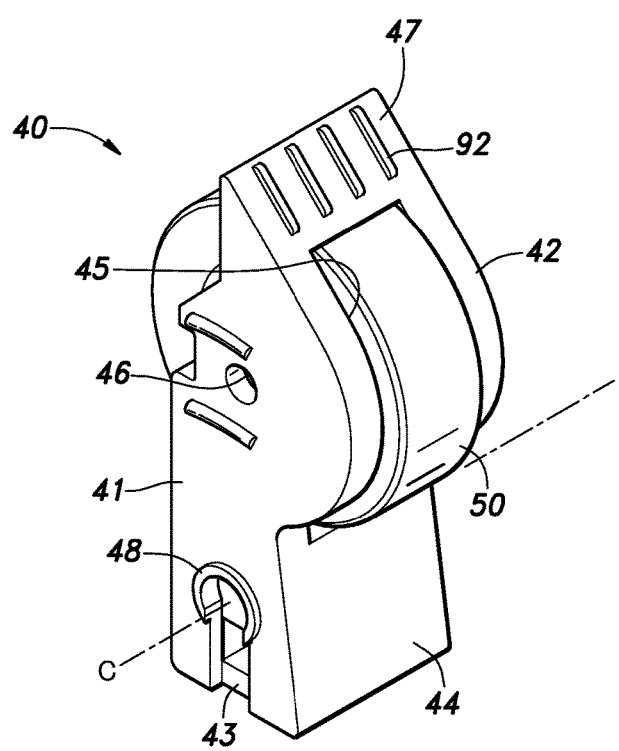
FIG. 13 is a perspective view of a modification of the swing member.

For example, as shown in FIG. 13, linear ribs 92 each having a predetermined width may be formed on the surface of the inclined surface 47 of the swing member 40. In FIG. 13, four ribs 92 are formed. The rib 92 may extend along the direction of the inclination of the inclined surface 47. These ribs 92 reduce the contact area between the container 80 and the inclined surface 47 when inserting the container 80 into the housing recess 21 is reduced as compared to the case where no such ribs are formed, than in the case where the ribs 92 are not provided so that the frictional resistance which the container 80 receives from the inclined surface 47 is reduced. Therefore, the insertion of the container 80 into the recess 21 is further facilitated. The shape and extending direction of the ribs 92 can be appropriately changed.

In the foregoing embodiments, the swing member 40 were pivotally supported at a position lower than the roller 50. However, it is also possible to pivotally support the swing member 40 at a position higher than the roller 50. The roller 50 was formed by integrally combining the inner member and the outer member in the foregoing embodiments, but may also be formed by double injection molding.

| GLOSSARY OF TERMS | | | |
|---|---|---|---|
| 10, 90 | container holder | 20 | body |
| 21 | recess | 30 | support portion |
| 40 | swing member | 47 | inclined surface |
| 50 | roller | 53 | outer periphery |
| 60 | torsion coil spring (biasing member) | | |
| 70 | other types of container holders | | |
| 80 | container | 91 | second inclined surface |
| A | central axial line | B | rotational center line |
| C | rotational center line | | |

The invention claimed is:

1. A container holder for holding a container, comprising:
   a main body formed with a recess having an open top defined therein for receiving a container;
   a swing member rotatably supported by the main body so as to be swung into and out of the recess;
   a roller supported by the swing member so as to be rotated around a prescribed rotational center line by the container engaging the roller as the container is pushed into and pulled out of the recess; and
   a biasing member urging the swing member into projecting into the recess;
   wherein the swing member is provided with an inclined surface extending downward from a first part thereof located outward of an outer periphery of the roller, above the roller and outward of the recess to a second part thereof located directly above the rotational center line of the roller or more inward of the recess than the rotational center line of the roller, the second part being located above the roller, and
   wherein a rotational center line of the swing member is positioned below the roller.

2. The container holder according to claim 1, wherein the inclined surface extends to a part adjoining an axial end of the roller.

3. The container holder according to claim 1, wherein the roller is provided with a surface layer having a higher frictional coefficient than the inclined surface of the swing member.

4. The container holder according to claim 1, wherein the roller includes an inner member consisting of a rotary shaft and an outer member consisting of a cylindrical member fitted on an outer periphery of the inner member, and wherein the outer member is made of a material having a higher coefficient of friction than the inner member.

5. The container holder according to claim 1, wherein a rib is provided on the inclined surface.

6. The container holder according to claim 1, wherein a bottom wall of the recess is provided with a surface layer having a higher frictional coefficient than a side wall of the recess.

7. A container holder for holding a container, comprising:
a main body formed with a recess having an open top defined therein for receiving a container;
a swing member rotatably supported by the main body so as to be swung into and out of the recess;
a roller supported by the swing member so as to be rotated around a prescribed rotational center line by the container engaging the roller as the container is pushed into and pulled out of the recess; and
a biasing member urging the swing member into projecting into the recess;
wherein the swing member is provided with an inclined surface extending downward from a part thereof located outward of an outer periphery of the roller, above the roller and outward of the recess to a part thereof located directly above the rotational center line of the roller or more inward of the recess than the rotational center line of the roller,
wherein a rotational center line of the swing member is positioned below the roller,
wherein the roller includes an inner member consisting of a rotary shaft and an outer member consisting of a cylindrical member fitted on an outer periphery of the inner member,
wherein the outer member is made of a material having a higher coefficient of friction than the inner member, and
wherein a projection is formed in one of the outer periphery of the inner member and an inner periphery of the outer member, and a corresponding recess is formed in the other of the outer periphery of the inner member and the inner periphery of the outer member so that the inner member and the outer member are combined with each other by fitting the projection into the recess.

* * * * *

UNITED STATES PATENT AND TRADEMARK OFFICE
CERTIFICATE OF CORRECTION

PATENT NO. : 10,293,732 B2
APPLICATION NO. : 15/567759
DATED : May 21, 2019
INVENTOR(S) : Inoue et al.

Page 1 of 1

It is certified that error appears in the above-identified patent and that said Letters Patent is hereby corrected as shown below:

On the Title Page

In item (73), in Assignee, "Honda Motor Co., Ltd., Tokyo (JP)" should be -- Honda Motor Co., Ltd., Tokyo (JP), and Nifco Inc., Yokosuka-shi, Kanagawa (JP) --.

Signed and Sealed this
Seventh Day of April, 2020

Andrei Iancu
*Director of the United States Patent and Trademark Office*